(12) United States Patent
Trane (10) Patent No.: US 7,370,794 B2
(45) Date of Patent: May 13, 2008

(54) DEVICE AND SYSTEM FOR PRESENTING AND FACILITATING PAYMENT OF A RESTAURANT BILL

(76) Inventor: Fleming Trane, 303 Truscott Pl., Aspen, CO (US) 81611

( * ) Notice: Subject to any disclaimer, the term of this patent is extended or adjusted under 35 U.S.C. 154(b) by 133 days.

(21) Appl. No.: 11/377,601

(22) Filed: Mar. 15, 2006

(65) Prior Publication Data

US 2007/0215695 A1 Sep. 20, 2007

(51) Int. Cl.
*G06K 5/00* (2006.01)
(52) U.S. Cl. ....................... 235/380; 235/492
(58) Field of Classification Search ................ 235/380, 235/375, 381, 383, 486, 487, 493, 492
See application file for complete search history.

(56) References Cited

U.S. PATENT DOCUMENTS

| 6,220,516 B1 * | 4/2001 | Tuttle et al. ................. 235/492 |
| 6,375,780 B1 * | 4/2002 | Tuttle et al. ................. 156/226 |
| 6,636,835 B2 | 10/2003 | Ragsdale-Elliot et al. |
| 6,848,613 B2 | 2/2005 | Nielsen et al. |
| 2001/0007335 A1 * | 7/2001 | Tuttle et al. ................. 235/492 |
| 2002/0194072 A1 | 12/2002 | Blink et al. |
| 2003/0078793 A1 | 4/2003 | Toth |
| 2004/0143503 A1 | 7/2004 | Suthar |
| 2004/0158494 A1 | 8/2004 | Suthar |
| 2005/0043996 A1 | 2/2005 | Silver |
| 2005/0045715 A1 * | 3/2005 | Lombardino ................. 235/380 |
| 2005/0065851 A1 | 3/2005 | Aronoff et al. |
| 2005/0071232 A1 | 3/2005 | Frater |
| 2005/0108116 A1 | 5/2005 | Dobson et al. |
| 2005/0125293 A1 | 6/2005 | Germinara et al. |
| 2007/0115650 A1 * | 5/2007 | Cohan et al. ................. 362/99 |

* cited by examiner

*Primary Examiner*—Thien Minh Le
(74) *Attorney, Agent, or Firm*—Merchant & Gould P.C.

(57) ABSTRACT

A device, system and method are disclosed for presenting a bill to restaurant patrons, and facilitating the payment of the bill by the patrons. A basic embodiment of the device includes a computing system and a billfold for housing at least a portion of the computing system. The computing system includes at least a pressure sensitive display, a magnetic strip reader for inputting payment information, a memory for storing computer executable instructions and a processing unit for executing computer executable instructions.

20 Claims, 7 Drawing Sheets

Prior Art

| 702 - Thank you for Dining at XYZ Restaurant / Your Total Bill Is: $54.00 / How many Patrons will be paying? / 1 2 3 4 5 6 7 8 9 / 10 11 12 13 14 15 / 16 17 18 19 20 (704) |

FIG. 7A

| 706 - Please Select the Items For Payment By Patron 1. Then Select Enter. OR |
|---|
| Divide Bill Equally — 710 |
| Appetizer 1   $6.00 |
| Appetizer 2   $7.00 |
| Drink 1   $2.00 |
| Drink 2   $3.00 |
| Entrée 1   $16.00 |
| Entrée 2   $13.00 |
| Dessert 1   $4.00 |
| Sales Tax   $2.00 |
| Total   $54.00 |
| Enter | Cancel — 714 |

| 716 - Please Select the Items For Payment By Patron 1. Then Select Enter. OR |
|---|
| Divide Bill Equally |
| Appetizer 1   $6.00 |
| Appetizer 2   $7.00 — 718 |
| Drink 1   $2.00 — 720 |
| Drink 2   $3.00 |
| Entrée 1   $16.00 |
| Entrée 2   $13.00 — 722 |
| Dessert 1   $4.00 |
| Sales Tax   $2.00 |
| Total   $54.00 |
| Enter | Cancel |

FIG. 7C

| 724 - Patron 1 Has Selected the Following Items: |
|---|
| Appetizer 2   $7.00 |
| Drink 1   $2.00 — 726 |
| Entrée 2   $13.00 |
| Sales Tax   $1.00 — 728 |
| Subtotal   $23.00 — 730 |
| Gratuity   $0.00 — 732 |
| 0 1 2 3 4 / 5 6 7 8 9 — 734 |
| 15% 18% / 20% 25% — 736 |
| Total   $23.00 — 738 |
| Enter | Cancel |

FIG. 7D

| 740 - Patron 1 Has Selected the Following Items: |
|---|
| Appetizer 2   $7.00 |
| Drink 1   $2.00 |
| Entrée 2   $13.00 |
| Sales Tax   $1.00 |
| Subtotal   $23.00 |
| Gratuity   $4.00 — 732 |
| 0 1 2 3 4 / 5 6 7 8 9 |
| 15% 18% / 20% 25% |
| Total   $27.00 — 738 |
| Enter | Cancel |

FIG. 7E

| 742 - How will Patron 1 be Paying? |
|---|
| Credit/Debit Card — 744 |
| Or |
| Cash — 746 |
| Enter | Cancel |

FIG. 7F

| 748 - Please Slide Card |
|---|
| ⇒ ⇒ ⇒ ⇒ ⇒ ⇒ ⇒ ⇒ — 750 |
| Cancel |

FIG. 7G

| 752 - Patron 1, Please Sign on Signature line: |
|---|
| X______________ — 754 |
| Patron 1, Enter your E-Mail Below If you Wish To Have Your Receipt E-Mailed: |
| [          ] — 756 |
| 1 2 3 4 5 6 7 8 9 / 0 A B C D E F G / H I J K L M N O / P Q R S T U V W / X Y Z @ # $ % & — 758 |
| Enter | Cancel |

FIG. 7H

DEVICE AND SYSTEM FOR PRESENTING AND FACILITATING PAYMENT OF A RESTAURANT BILL

FIELD OF THE INVENTION

The present invention relates to presenting customers with a restaurant bill, more specifically it relates to a device and system for presenting and facilitating payment of a restaurant bill.

BACKGROUND OF THE INVENTION

A restaurant bill is typically presented to a patron in a billfold. The billfold is typically made using two pieces of stiff cardboard or plastic covered in a flexible vinyl or leather covering. Optionally, the billfold may include some soft padding material between the stiff cardboard or plastic and the flexible outer covering. A hinge, made from the same flexible vinyl or leather material used to cover the cardboard or plastic, attaches the two pieces. The billfold may be opened and closed like a book, and include a number of interior pockets for holding a variety of items including: the bill, cash, a credit card, a pen etc. The billfold is thin enough to allow a waitperson to carry numerous billfolds in apron pockets or pant pockets. The thin feature of the billfolds allows a waitperson to carry a billfold for each table that the waitperson is servicing. The billfold is very commonly used, and when people dine out, they have come to expect their bill to be presented to them in a billfold.

It is very common for people to eat out at restaurants in groups. When a waitperson takes a group's order, they will typically take the order and assume that only one bill should be presented to the group and let the group sort out payment, unless the group notifies the waitperson otherwise. The process of sorting out what each member of the group should pay, for items they ordered and also gratuity is cumbersome. In some cases, sorting through payment of a bill may even result in socially uncomfortable and embarrassing situations. For example, if the group decides to divide the bill evenly, one member of the group may object, because their order was substantially less expensive than other members of the group. As another example, one member of the group may have a policy of leaving only a small amount of gratuity, whereas other members of the group may have a policy of leaving a generous amount of gratuity. This could lead to an embarrassing situation of trying to encourage a member of the group to leave a larger amount of gratuity. These situations complicate the payment of a restaurant bill.

From a restaurant's perspective, accepting a number of payments for a single bill is also inefficient. People pay restaurant bills using a variety of payment methods including cash and credit or debit cards. Presently, if a group of patrons decides to divide a bill, a waitperson may have to process a variety of payment forms. For example, some members of a group may pay in cash while other members of the group may pay using credit or debit cards. In this situation, a waitperson must go to the table to get instructions from the patrons for processing the various payment methods. The waitperson must then go to a central location where credit or debit cards may be processed, and a cash register can be accessed to retrieve appropriate change for those patrons paying in cash. The waitperson must then return to the table with credit or debit card receipts for signature by those patrons paying with credit or debit cards, and return the appropriate change to those patrons paying in cash. This time consuming process may be particularly inefficient when a restaurant is very busy and/or short staffed.

What is needed is a device that generally has the appearance of a billfold, with which patrons and waitpersons are familiar, but that allows for efficient payment of a bill, including dividing payment among members of a group of patrons.

SUMMARY OF THE INVENTION

In one aspect, the present invention is directed at a device for presenting and facilitating payment of a restaurant bill. The device includes a computing system and a billfold. Advantageously, the use of the billfold allows the device to seem familiar to both waitpersons and patrons. The computing system includes at least a memory for storing computer executable instructions, a processing unit for executing the instructions, a display for displaying information to patrons and a magnetic strip reader to allow input of credit/debit card information by patrons.

BRIEF DESCRIPTION OF THE DRAWINGS

FIG. 7A-7H show screens that may be displayed to implement one embodiment of the present invention.

DETAILED DESCRIPTION OF THE INVENTION

The present invention provides for a device resembling a billfold for presenting and processing a bill for payment by restaurant patrons. The present invention has the appearance of a typical billfold that patrons and waitpersons are familiar with for presenting restaurant bills. Additionally, the present invention provides for a system and method that facilitates payment of a restaurant bill by a group of patrons, including the ability to split the payment of a bill among the group of patrons.

Figure 1:
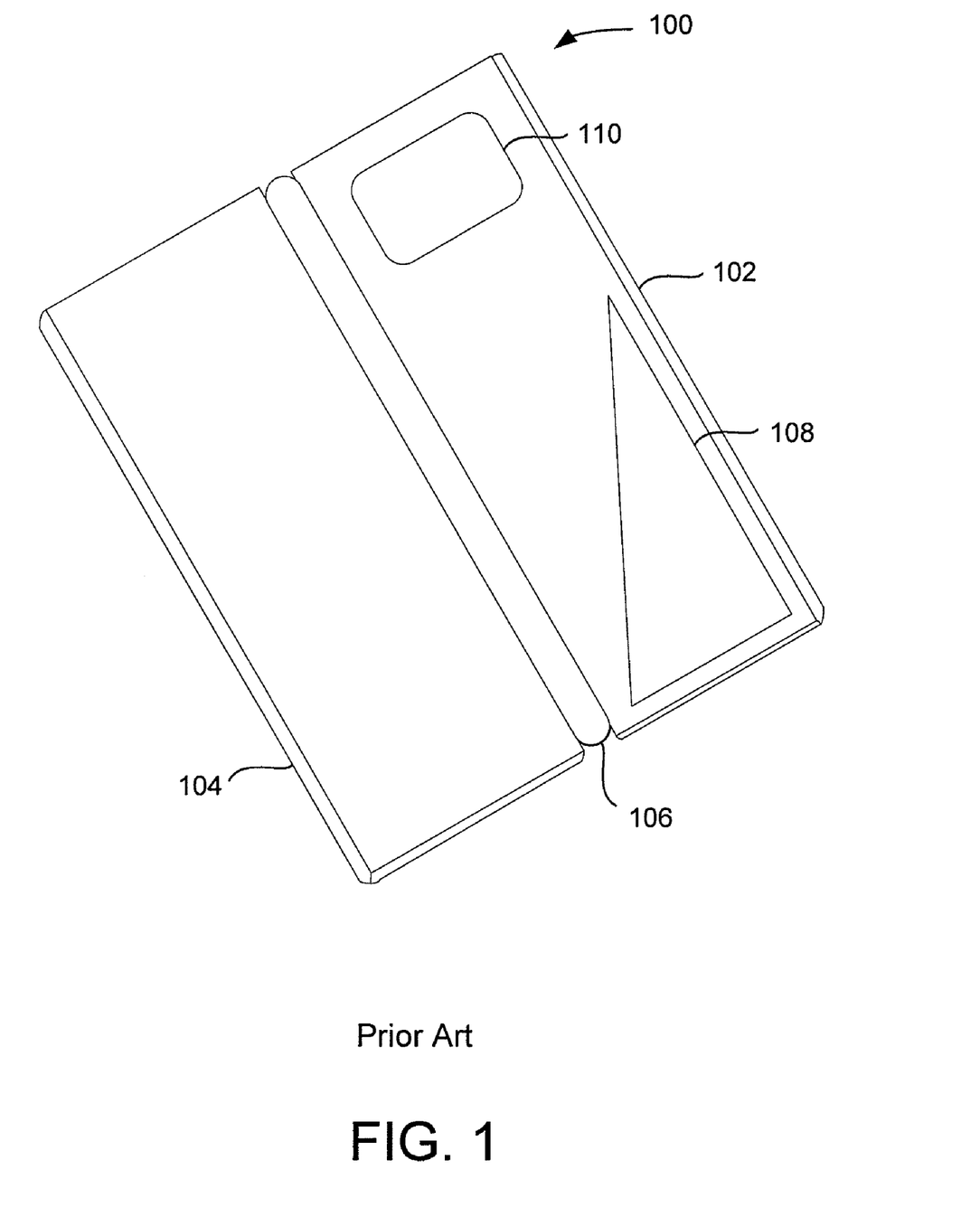
FIG. 1 shows a conventional billfold used to present restaurant bills to patrons.

FIG. 1 shows a conventional billfold 100 used to present a bill to restaurant patrons. The billfold 100 includes a first flap 102 and a second flap 104 that are connected by hinge 106. The billfold also includes pockets 108 and 110. As is well known in the art, flaps 102 and 104 are typically made using a piece of stiff material, such as plastic or cardboard that is covered with a flexible material. Some common flexible materials used to make billfolds include leather, vinyl and textile materials made from polyester or natural fibers. The two flaps are hingedly connected by hinge 106, so that the two flaps open and close like a book. In its simplest form, hinge 106 may be a piece of the flexible material used to cover flaps 102 and 104. In other cases, hinge 106 may include a number of separate components that make up the hinge, such as hinge pins, hinge plates, bushings, etc. Pocket 108 is used to hold a variety of items such as credit/debit cards, bills, receipts, cash, coupons, etc. Pocket 110 may also be used to hold a variety of items although typically pocket 110 is used to hold credit/debit cards.

It is should be understood that billfolds are well-known in the services industry, and that billfold 100 shown in FIG. 1 is shown for exemplary purposes only. The term "billfold" as used in this patent application is not intended to be limited by the description of billfold 100 and FIG. 1. As is well known by those of skill of the art, billfold's come in a variety of shapes and sizes. Although the flaps commonly have a rectangular shape, they are not limited to that shape and may have other shapes such as elliptical, triangular or other polygonal shape. One common feature of all billfold's however is that they are relatively thin so that a waitperson can carry a number of them in an apron or pant pocket.

Figure 2A:
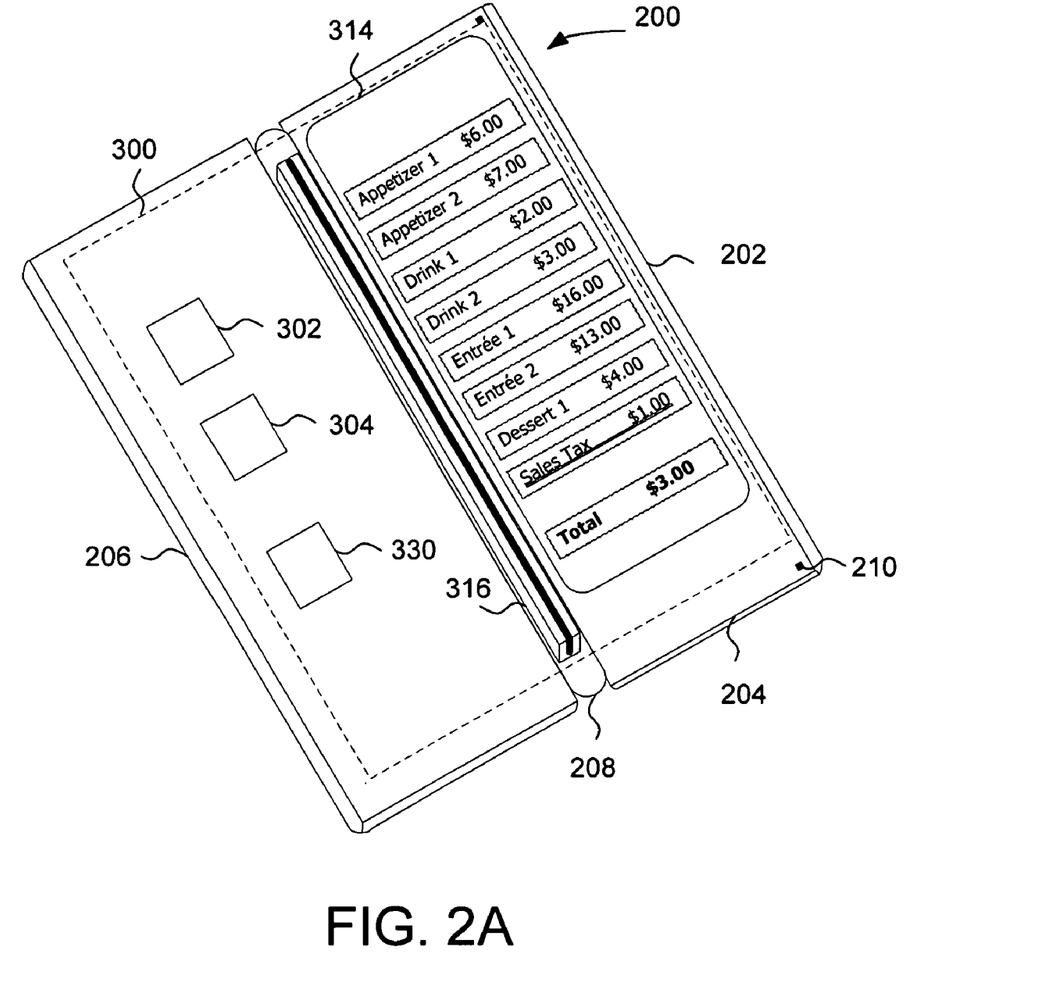
FIG. 2 shows a device in accordance with one embodiment of the present invention that is used to present and facilitate payment of restaurant bills.
Figure 2B:
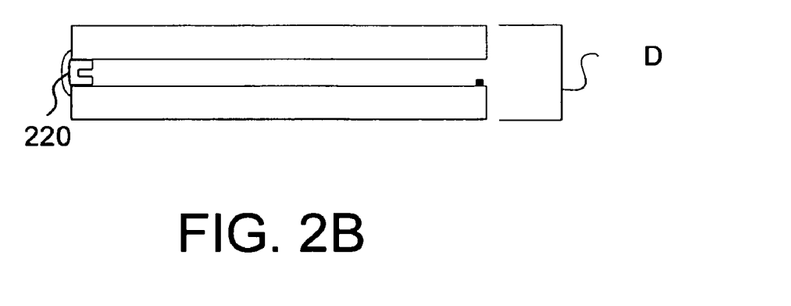

FIGS. 2A and 2B illustrate an example of a device 200 that is in accordance with one embodiment of the present invention. FIG. 2A shows a perspective view of device 200 when opened, and FIG. 2B shows a bottom elevational view of device 200 when closed. Device 200 includes a billfold 202, similar to billfold 100 described above with respect to FIG. 1, and a computing system 300. Billfold 202 includes a first flap 204 and a second flap 206. Flaps 204 and 206 are hingedly connected with hinge 208, which is made from a piece of flexible material.

Figure 3:
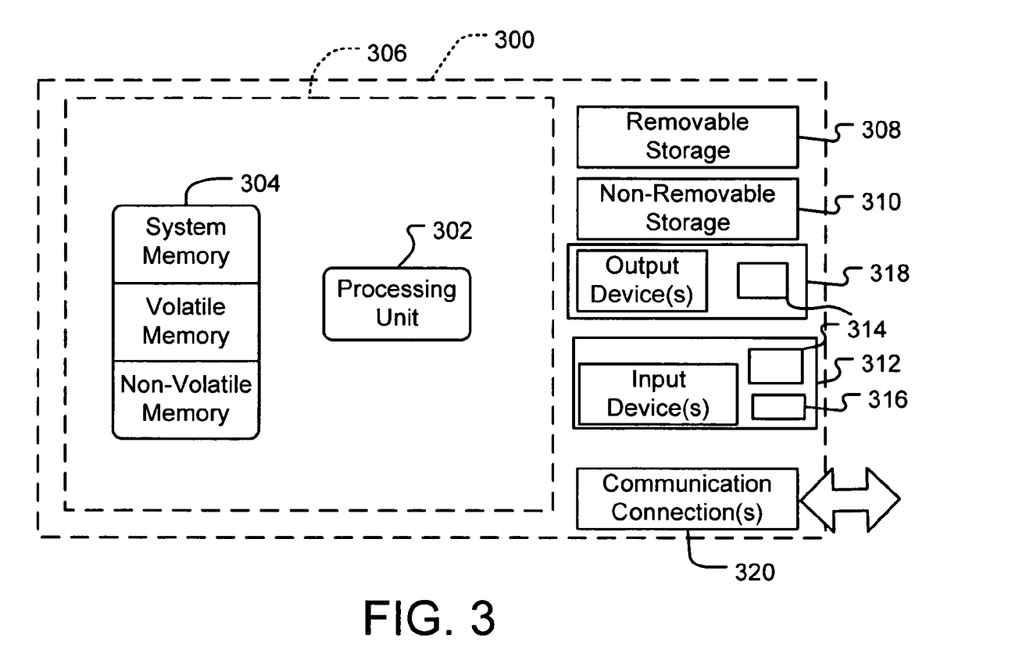
FIG. 3 shows a computing system that may be used to implement embodiments of the present invention.

Referring now to FIG. 3, shown in FIG. 3 is a block diagram of an exemplary computing system that may be used as computing system 300 of device 200. In its most basic configuration, computing system 300 typically includes at least one processing unit 302 and memory 304. Depending on the exact configuration and type of computing system 300, memory 304 may be volatile (such as RAM), non-volatile (such as ROM, flash memory, etc.), or some combination of the two. This most basic configuration of the computing device 300 is illustrated in FIG. 3 by dashed line 306. In addition to the basic components, system 300 may also have additional features/functionality. For example, computer system 300 may also include additional storage (removable and/or non-removable) including, but not limited to, flash memory, magnetic or optical disks. Such additional storage is illustrated in FIG. 3 by removable storage 308 and non-removable storage 310. Such computer storage media includes volatile and nonvolatile, removable and non-removable media implemented in any method or technology for storage of information such as computer readable instructions, data structures, program modules, or other data. Memory 304, removable storage 308, and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which can be used to store desired information and which can be accessed by system 300 and processor 302. Any such computer storage media may be part of system 300.

System 300 may also have input device(s) 312. Input devices 312 may include a variety of devices commonly used to input information into computer systems, such as a keyboard, mouse, pen, voice input device, pressure sensitive input device, etc. Input devices 312 may also include devices that read encoded information, some nonlimiting examples including magnetic strip readers, smart card readers and bar code readers. In one specific embodiment of the present invention, computer system 300 has input device(s) 312 that include at least a pressure sensitive display 314 and a magnetic strip reader 316. A restaurant patron, using device 200 may input information by touching portions of the pressure sensitive display 314, as is well known in the art, and as is explained in further detail below. The magnetic strip reader 316 may be used by a patron to input payment information that may be encoded on a magnetic strip, as is commonly found on credit and debit cards.

Computer system 300 may also include output device(s) 318. Some non-limiting examples of output devices include a display, speakers, printer, etc. These devices, either individually or in combination can form a user interface. In one embodiment of the present invention, computer system 300 includes at least the pressure sensitive display 314.

System 300 may also contain communications connection (s) 320 that allow the device to communicate with other devices. Communications connection(s) 320 is an example of communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared, and other wireless media.

In one specific embodiment, computer system 300 will include at least a wireless communication connection 320 to a central work station. The wireless communication connection may be implemented using wireless components 330 (shown in FIG. 2A). The wireless components 330 may include without limitation, a wireless modem, antenna, receiver and transmitter. Wireless communication connection 320 will allow information to be transmitted between the computer system 300 and the central work station. As is described below, some examples of information that may be transmitted between the computer system 300 and the central work station include payment information, order information, and information about conditions within a restaurant.

It should be understood that the description of computer system 300 above is general and exemplary, and as those of skill in the art understand, computer system 300 may include a variety of other component's not described above, but used to implement computer system 300, some nonlimiting examples include controllers, interface circuits, buses, caches.

Referring back to FIGS. 2A and 2B, device 200 shows one embodiment of a device that is in accordance with the present invention. As shown in FIG. 2A, computer system 300 includes pressure sensitive display 314, which displays information to a restaurant patron and is also used as an input device for receiving information from a patron. In this embodiment, pressure sensitive display 314 is an LCD touch-screen, although in other embodiments pressure sensitive display 314 may be implemented using different technology or devices. As shown in FIG. 2A, pressure sensitive display 314 is housed within flap 204 of billfold 202. By "housed," it is meant that at least a portion of pressure sensitive display 314 is within flap 204. Additionally, computer system 300 also includes processing unit 302, storage 304, and communication components 330 for establishing a wireless communication connection 320 with a central work station. Processing unit 302, storage 304 and communication components 330 are housed within flap 206.

Finally, computer system 300 includes magnetic strip reader 316, which is attached along hinge 208. Magnetic strip reader 316 may be attached to hinge 208 by any suitable means, such as rivets 220. As those of skill in the art understand, computer system 300 shown in FIGS. 2A and 2B also includes a variety of wired or wireless connections (not shown) that are used to connect the various components to allow communication of information among the components. Additionally, device 200 also includes stops 210 that protect pressure sensitive display 314 when device 200 is closed, as shown in FIG. 2B.

Device 200 is durable so that it handles the normal conditions of use in a restaurant. For example, the electronic components of computer system 300 are water resistant to avoid failure if water or some other drink is spilled on it. By water resistant it is meant that they are properly sealed to avoid moisture from interfering with their proper operation. Additionally, device 200 should be impact resistant to avoid failure of the electronic components when, for example, device 200 is dropped on the floor. In this regard, in some embodiments, billfold 202 may include some additional shock absorbing material to protect the components of computer system 300. For example, flap 204 may include some additional shock absorbing material (e.g., foam or other padding) to protect processing unit 302, storage 304, and communication components 330 if device 200 should be dropped.

Referring now to FIG. 2B, when device 200 is closed, it has a height, or thickness, of dimension D. As described above, one feature of traditional billfolds, and also of device 200, is that dimension D is small enough to allow a waitperson to carry a number of devices at a time. In some embodiments, dimension D may be less than 5 cm and in other embodiments it may be less than 2.5 cm. In yet other embodiments, device 200 may have a dimension D that is no less than 0.5 cm and no greater than about 3 cm. Other possible ranges for dimension D include: no less than 0.25 cm and no greater than 2.5 cm; no less than 0.2 cm and no greater than 2 cm; no less than 1 cm and no greater than 2 cm; no less than about 1.25 cm and no greater than 2 cm and no less than 0.5 cm and no greater than 5 cm.

Figure 4A:
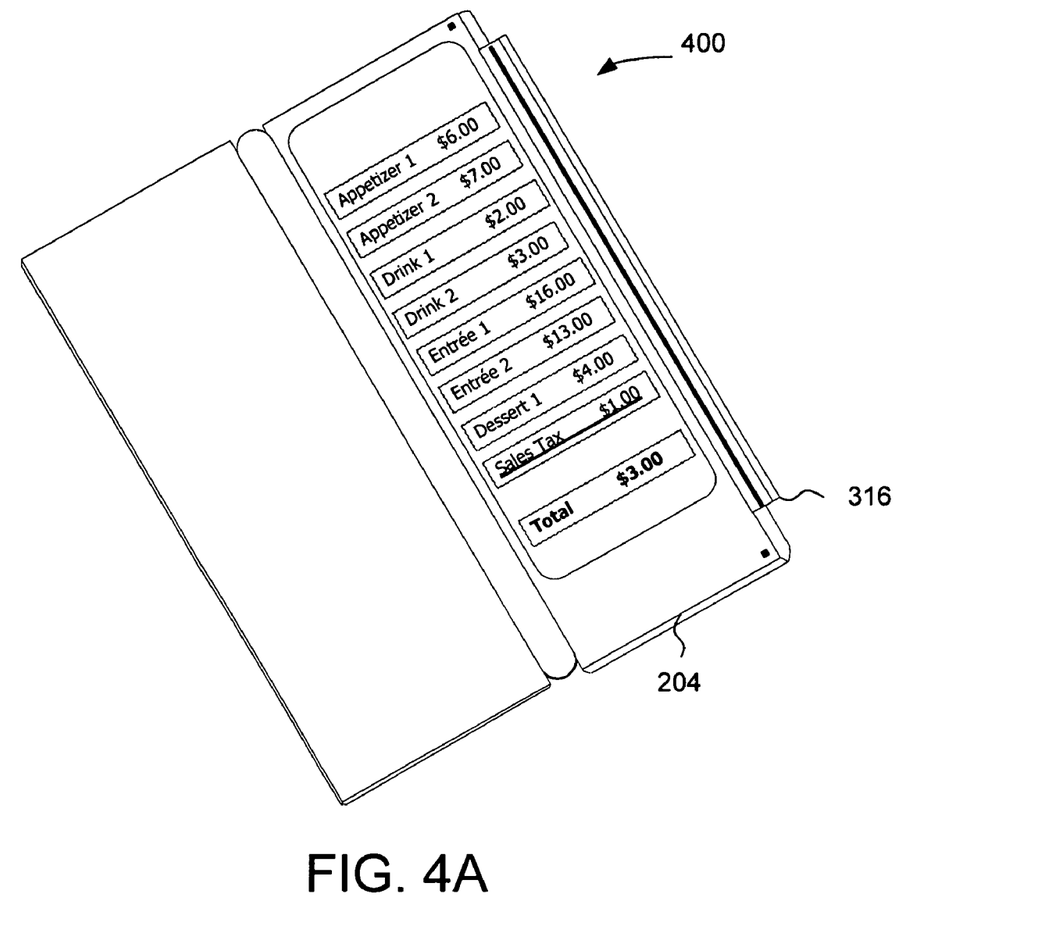
FIG. 4 shows another device in accordance with one embodiment of the present invention that is used to present and facilitate payment of restaurant bills.
Figure 4B:
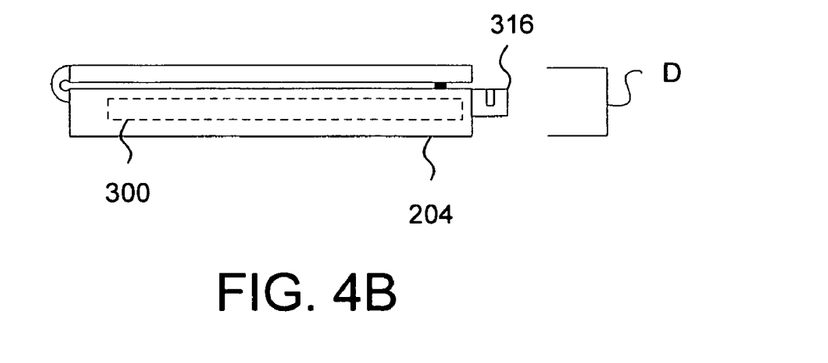

Referring now to FIGS. 4A and 4B, they illustrate an example of a device 400 that is in accordance with another embodiment of the present invention. FIG. 4A shows a perspective view of device 400 when opened and FIG. 4B shows a bottom elevational view of device 400 when closed. Similar parts are numbered the same as in FIG. 2A and FIG. 2B. Device 400 includes billfold 202 and computer system 300, as described above. However, in device 400, magnetic strip reader 316 is positioned along an outer edge of flap 204, rather than along the outside of hinge 208. Having magnetic strip reader 316 along an outer edge off flap 204 allows a patron or waitress, using device 400 to be able to look at display 314, while processing a card with reader 316. In contrast, in device 200, a user must close device 200 to process a card with reader 316.

Figure 5:
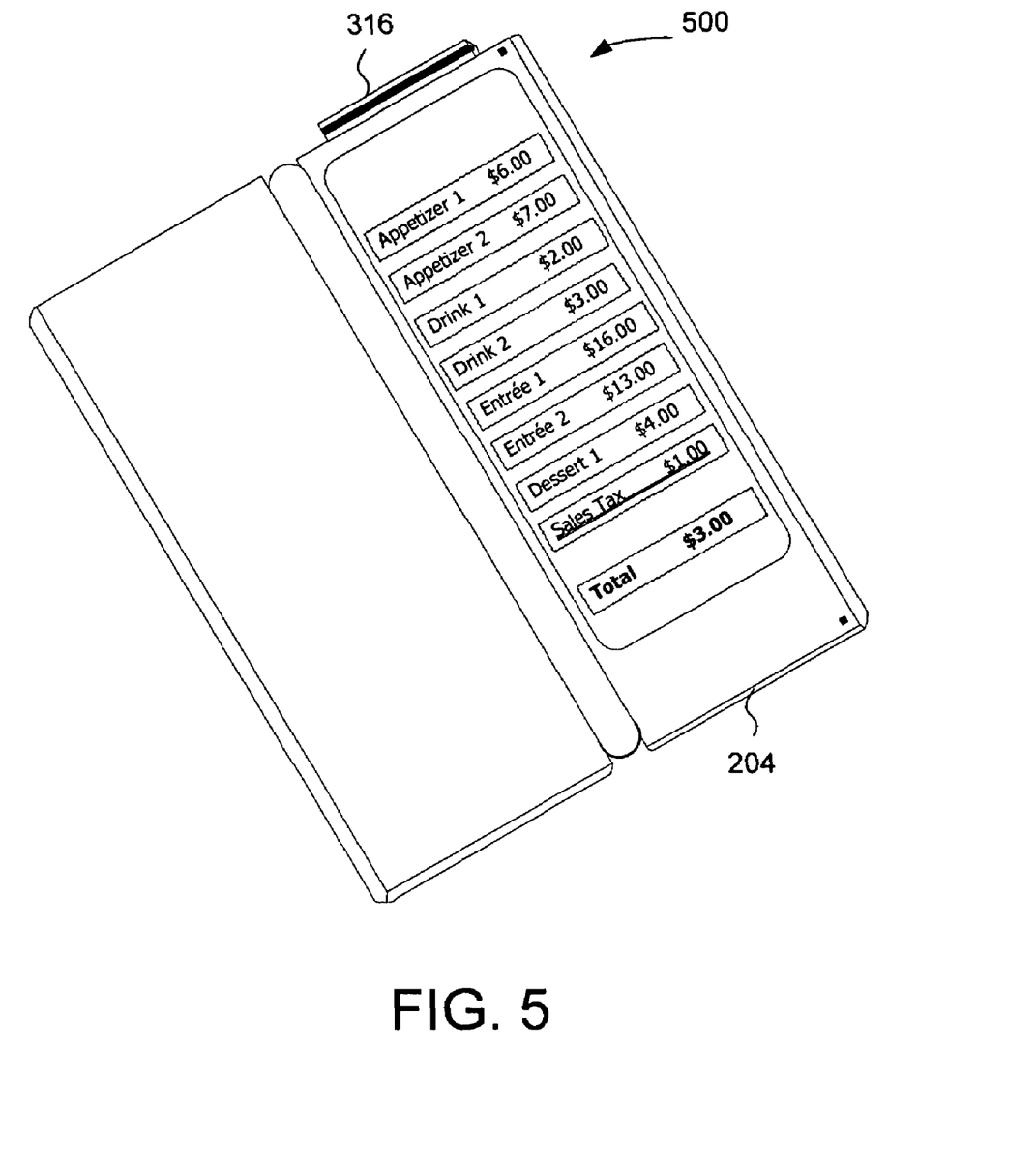
FIG. 5 shows another device in accordance with one embodiment of the present invention that is used to present and facilitate payment of restaurant bills.

It should be understood that the position of reader 316 is not limited to the positions shown in device 200 and device 400. Reader 316 may be positioned in any location suitable for allowing a user to process a card using reader 316. However, as stated above, device 400 has the advantage of allowing a user to see display 314 when processing a card with reader 316. There are numerous ways to position card reader 316 and still allow a user to see display 314 when processing a card. In this regard, reference is made to FIG. 5, which shows device 500 with magnetic strip reader 316 positioned on a top edge of flap 204. Device 500 also has the advantage of allowing a user to see display 314 while processing a card using reader 316. Other nonlimiting examples of locations for positioning card reader 316 that allow a user to see display 314 while processing a card include on a bottom edge of flap 204, on a top edge of flap 206, on a bottom edge of a flap 206 and along a side edge of flap 206. The foregoing are merely illustrative examples, and as will be evident to those of skill in the art the position of card reader 316 may be changed to accommodate other design considerations in addition to allowing a user to see display 314.

Referring now to FIG. 4B, device 400 includes all of the components of computer system 300 in a single flap. As can be seen in a FIG. 4B, flap 204 is thicker to accommodate all of the components of computer system 300. However, device 400 maintains the same total thickness of dimension D, as described above for device 200. This illustrates that the thickness of the individual flaps 204 and 206 may vary depending on a variety of considerations some examples including, the location of the various components of computer system 300 (e.g., reader 316), and the need to include shock absorbing and water resistant features to protect computer system 300. Nevertheless, the overall thickness of the device should be within a range similar to conventional billfolds used in the restaurant industry (see description of dimension D above).

Another feature of the present invention provides for facilitating payment of a restaurant bill using a device such as device 200. It should be understood that the following description of a method for payment of a restaurant bill is presented with respect to device 200, described above, and a central work station. However, the method of the present invention is not limited to any specific device, or combination of devices, and may be performed using any suitable device or combination of devices that can perform the steps described below. Moreover, although some steps may be described as being performed by device 200 and others by a central work station, the invention is not limited thereto.

Figure 6:
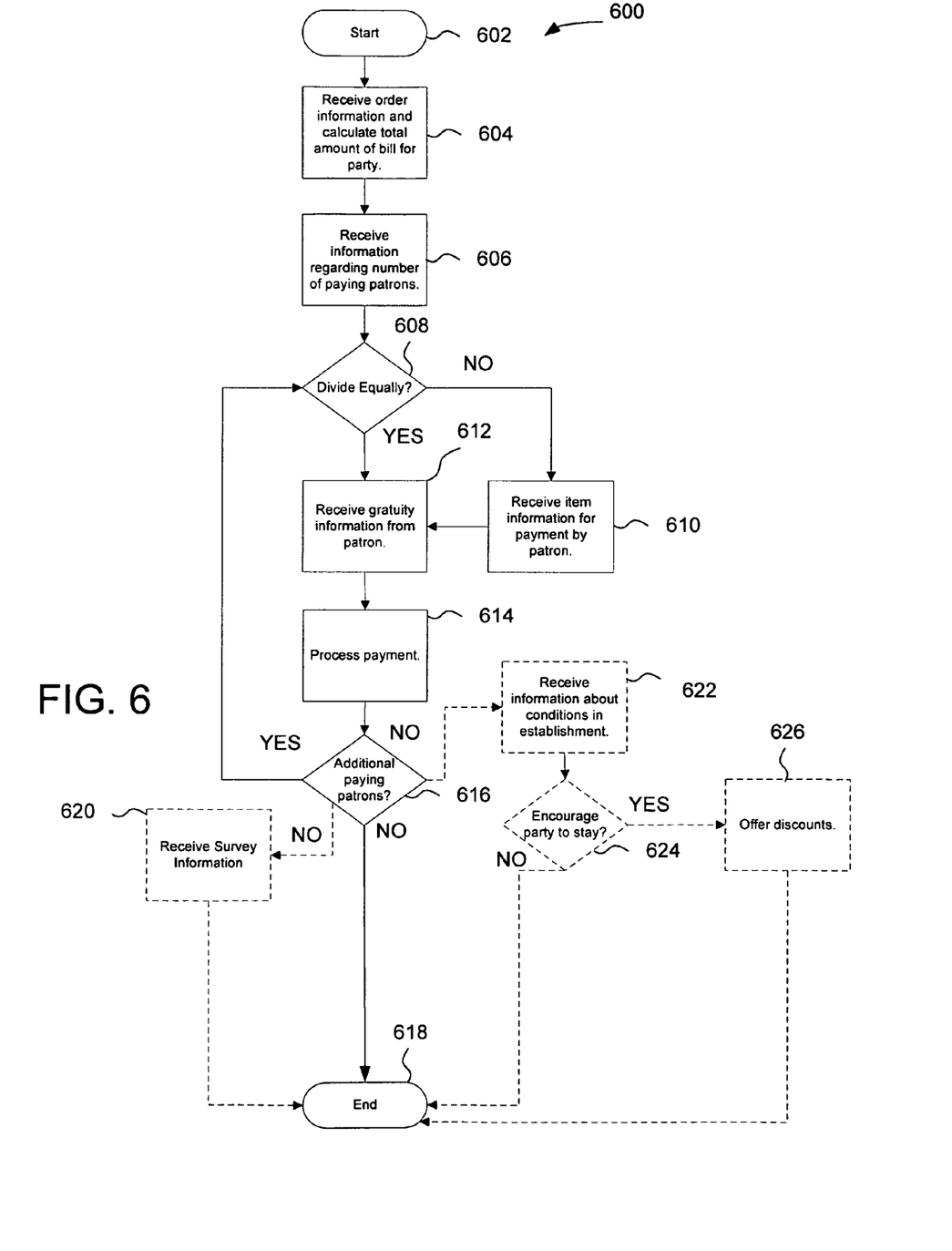
FIG. 6 shows a flow chart that illustrates a method of paying a restaurant bill in accordance with one embodiment of the present invention.

FIG. 6 shows a process flow chart 600 for a method of paying a restaurant bill, using device 200. The process starts at step 602. At step 604, device 200 receives order information regarding a particular group of patrons referred to herein as "a party," and calculates the total amount of the bill for the party. The order information may be received by being directly input into device 200 by a waitperson when taking a party's order. Alternatively, the order information may be received from a central workstation where the information was input by the waitperson. Once order information has been received, the total amount of the bill for the party is calculated by adding the price for each item ordered by the party and adding any applicable tax.

At step 606, information regarding the number of paying patrons is received. The information regarding the number of paying patrons may be received by prompting the party to input the number of paying patrons using pressure sensitive display 314. For example, an array of numbers may be displayed on display 314, and a patron may select the appropriate number of paying patrons by touching the screen in a location where the appropriate number is being displayed. A description of a number of screens that may be displayed by pressure sensitive display 314 and utilized to implement the method of the present invention is described below with respect to FIGS. 7A-7H.

After selecting the number of paying patrons, a party is prompted to decide if the bill should be divided evenly among the paying patrons. At step 608, the party decides whether the bill will be divided evenly. If the bill will not be divided evenly, the first paying patron is prompted to choose the particular items that they will pay for. At step 610, device 200 receives item information from a first paying patron. In one example, device 200 may receive item information by displaying on display 316 a list of items ordered by the party, and the patron may select the items from the list by touching the screen in a location where the items are being displayed. After device 200 receives the item information from the paying patron, the patron is prompted for gratuity information at step 612 (described below). Alternatively, if the paying patrons decide to divide the payment of the bill evenly among them, step 610 is skipped entirely and the control passes directly to step 612 where gratuity information is received from a first paying patron.

At step 612, device 200 may receive gratuity information by displaying on display 316 an array of numbers that a patron may select by touching the screen in a location where the appropriate number is being displayed. A patron may use this array to enter a dollar amount for gratuity. Alternatively, percentages (e.g., 10%, 15%, 20% etc) may be displayed on display 314, and a patron may select a percentage by touching the screen in a location where the appropriate percentage is being displayed.

After a paying patron has input the gratuity information, at step 614 a patron will process payment of their portion of the bill. Processing of the payment may include a number of sub-steps that depend on how a patron chooses to pay for the bill. In this regard, the patron may first be prompted to select a method for payment. Device 200 may display on display 314 a list of payment methods such as, cash, credit card, or debit card. A patron may select the desired method by touching the screen in a location where the desired method is being displayed. Once the patron has chosen a particular method for payment, subsequent steps may be performed to process the particular type of payment method.

As one example, if a patron chooses to pay using a credit card, the patron may be prompted by device 200 to slide their credit card through reader 316 to obtain credit card information from the patron. Device 200 may communicate information to a central work station that authorizes the transaction through another network, such as the Internet or other network for authorizing credit transaction. After authorizing the transaction, the patron may then be prompted to sign on a signature line displayed on display 314. The signature information may be communicated by device 200 to the central work station, where a receipt may be printed. After all of the patrons have paid their portion of the bill, a waitperson may deliver a receipt to each patron who paid with a credit card.

Alternatively, a patron may be given a choice whether to receive a receipt at all, or the particular method by which they would like to receive a receipt. For example, after a patron signs on a signature line, device 200 may display on display 314 a list of methods relevant to receiving a receipt (e.g., no receipt, paper receipt, electronic mail receipt). A patron may select the desired method by touching the screen in a location where the desired method is being displayed. In some embodiments, a patron may choose multiple methods, such as paper receipt and electronic mail receipt. Clearly, some selections may require additional steps to execute, for example, if a patron chooses to receive a receipt via electronic mail, the patron will be prompted to enter the desired electronic mail address for delivery of the receipt.

As another example, if a patron chooses to pay with cash, the patron may be prompted to enter a dollar amount that will be tendered. Device 200 may receive the payment information by displaying on display 314 an array of numbers that a patron may select by touching the screen in a location where the appropriate number is being displayed. A patron may use this array to enter a dollar amount that will be tendered for payment of their portion of the bill. The information may be communicated to a central work station where a waitperson may access the information to determine the necessary change to return to the patron. A waitperson may then go to the party's table and collect the tendered amount and return any change to the patron.

After processing payment step 614, at step 616, a determination is made whether there are additional patrons that will be paying a portion of the bill. If there are additional patrons, steps 610 (if necessary), 612 and 614 are repeated for each paying patron. If there are no additional paying patrons, the process will end at step 618.

Process flow 600 also shows some optional steps that may be performed in some embodiments. For example, in one embodiment, after all of the paying patrons have processed their payments, device 200 may prompt each paying patron to fill out a survey. At step 620, device 200 receives survey information from the paying patrons. Step 620 is illustrated with dashed lines to show that it is a step performed in an alternative embodiment. The survey information may relate to any information that may be useful for a restaurant to gather, such as information regarding a patron's opinion of the quality of the food, quality of the service, ambience, or their overall dining experience. The survey may be in any suitable format, nonlimiting examples including a rating scale (i.e., scale from 1 to 10), true or false questions, multiple-choice questions or combinations of the foregoing. Device 200 may implement the survey by displaying on display 314 a question and a selection of answers. A patron may select the desired answer by touching the screen in a location where the desired answer is displayed.

In another alternative embodiment, a party may be offered discounts to encourage them to purchase additional items. This embodiment may include performing the steps 622, 624 and 626, illustrated with dashed lines to show that they are steps performed in an alternative embodiment.

At step 622, device 200 receives information about conditions in the establishment. The conditions may relate to a number of factors that can be used to decide whether to encourage a party to purchase additional items. Some non-limiting examples of conditions include the time of day, the day of the week, the number of patrons waiting to be seated, the number of reservations for parties that have yet to arrive, the amount of money spent by the party, the particular items ordered by a party and food/drink inventory information.

After the information about the conditions has been received by device 200, at step 624 a determination is made whether to encourage the party to purchase additional items. The determination may be made in a variety of ways that take into consideration the conditions described above. For example, a determination may be based solely on the amount of money spent by the party. A threshold amount may be established, e.g., $250, which if met or exceeded will result in a determination that the party should be encouraged to purchase additional items. As another example, a determination may be based solely on whether there are patrons waiting to be seated. If any patrons are waiting to be seated, the determination may be that the party should not be encouraged to purchase more items. As yet another example, the determination may be based on a combination of factors, such as day of the week, time of day and the items ordered by a party. As one implementation of this example, on weekdays after 7:00 pm it may be desirable to encourage those parties that have ordered alcoholic beverages to stay and order additional items. Thus, if these three conditions exist, the determination may be made to encourage the party to order additional items. The foregoing are merely illustrative examples of how the conditions may be used to make a determination, and those of skill in the art will understand that the determination may be made in a variety of ways depending on the needs and preferences of a restaurant establishment. Moreover, as will be evident to those of skill in the art, other conditions in addition to those listed above may be used in making a determination of whether a party should be encouraged to purchase additional items. It should be noted that the determination may be made using an application, or software stored on either device 200, or on the central work station.

If at step 624 a determination is made to encourage a party to purchase additional items, a party is offered discounts at step 626. The offering of discounts may be performed for example by displaying the offers on display 314 of device 200. The offers may relate to a variety of items, for example appetizers, desserts, or drinks. The discounts may be offered in any suitable form some nonlimiting examples including buy one get one free, some percent off the additional items (e.g. 50% off), and by one get some percent off the second.

Referring now to FIGS. 7A-7H, each of these figures illustrate a screen that may be displayed on display 314 of device 200 for implementing a method of paying a restaurant bill using device 200, such as the method described with respect to flow chart 600. FIGS. 7A-7H are for illustration purposes only and are not intended to limit the present invention. Other screens may be used to implement a method of paying a restaurant bill, using device 200, or other device and still be within the scope of the present invention.

FIG. 7A shows a screen 702 that may be displayed on display 314 for indicating to a party their total bill and for prompting a party to enter the number of paying patrons. Screen 702 includes an array 704 of numbers that a party may use to input the number of paying patrons by touching the screen in a location where the appropriate number is being displayed.

After a party has selected the number of paying patrons, screen 706 shown in FIG. 7B may be displayed to prompt a first patron to select specific items for which they will pay, or to indicate that the bill will be divided equally among the paying patrons. Screen 706 includes a list 708 of the items purchased by the party, which the first paying patron may select by touching the screen in a location where the items are displayed. Screen 706 also includes a Divided Bill Equally field 710 that a patron may select to indicate that the bill will be divided equally.

Screen 706 also includes additional fields "Cancel" 712 and "Enter" 714. A patron may select the cancel field 712 to return to the screen that immediately preceded the current screen, or to return to some pre-selected screen that has been programmed to be displayed when a user selects the cancel field 712. For example, a device may be programmed to display screen 702, whenever a user selects the cancel field 712. A paying patron may use the enter field 714 to indicate that they have finished selecting the items they will pay for. A device may be programmed to proceed to a next step when a patron selects the enter field 714.

Screen 716 shown in FIG. 7C, illustrates screen 706 after a patron has selected items from list 708. Screen 716 shows that a patron has selected an Appetizer 718, a Drink 720, and an Entree 722 listed on the list 708. Screen 716 illustrates that the selected items may be highlighted to show that a patron has selected these particular items. A patron may deselect any items that have been highlighted by touching the screen in a location where the highlighted items are displayed.

After a patron has selected items to pay for and selected the enter field 714, a screen such as screen 724 shown in FIG. 7D may be displayed. Screen 724 includes the list 726 of the items that the first paying patron has selected. Additionally, screen 724 also includes a field 728 indicating any applicable sales tax. Field 730 displays a subtotal that includes the sum of the cost of the items selected by the first paying patron and the sales tax. Additionally, screen 724 also includes a "Gratuity" field 732 that displays an amount of gratuity that the first paying patron wishes to leave. The gratuity amount may be entered by the first paying patron in a dollar amount, using array 734 of numbers. Alternatively, the first paying patron may enter the gratuity amount as a percentage using the array 736 of percentages. If the first paying patron enters the gratuity using the array 736 of percentages, a device may be programmed to automatically multiply the selected percentage with the subtotal and enter the amount in gratuity field 732. Finally, screen 724 has a total field that displays the sum of the cost of the items selected by the first paying patron, the sales tax, and the amount of gratuity.

Screen 740 shown in FIG. 7E illustrates screen 724 after the first paying patron has entered an amount of gratuity in field 732. As can be seen in screen 740, field 738 has been updated to include the amount of gratuity entered into field 732.

After the first paying patron has entered the gratuity amount, and selected the enter field 714, screen 742 shown in FIG. 7F may be displayed. Screen 742 prompts the first paying patron to choose a method of payment. Screen 742 includes a credit/debit card field 744 and a cash field 746. The first paying patron may select the appropriate field from the credit/debit card field 744 and the cash field 746, then press the enter field 714.

FIG. 7G shows a screen 748 which may be displayed if the first paying patron selects the credit/debit card field 744 shown in screen 742. Screen 748 prompts the first paying patron to input their credit or debit card information by sliding the card through a magnetic strip reader, such as magnetic strip reader 316 in device 200. Additionally, screen 748 may include indicia 750 that indicate to the first paying patron where a magnetic strip reader is located. In other embodiments, indicia 750 may be eliminated.

FIG. 7H shows screen 752 which may be displayed after the first paying patron has input their credit/debit card information. Screen 752 includes a signature line 754 were a patron may sign to finish authorizing the credit/debit card transaction. Additionally, screen 752 also includes an electronic mail field of 756 and an array 758 of characters that may be used to input an electronic-mail address into field 756. This may be used to implement a method in which a patron may have the option of having a receipt delivered to them via electronic mail in the lieu of, or in addition to, a paper copy.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims. For example, although some embodiments of the device of the present invention have been described using a magnetic strip reader, other embodiments may include a smartcard reader and/or barcode reader in lieu of or in addition to the magnetic strip reader.

What is claimed is:

1. A device for presenting and facilitating payment of a restaurant bill, the device comprising:
   a computing system for processing payment of a restaurant bill, the computing system comprising:
      a pressure sensitive display for displaying information and for receiving input from a user;
      a magnetic strip reader for receiving payment information encoded on a magnetic strip;
      a wireless communication device for communicating with a central computing system;
      memory for storing computer executable instructions for facilitating payment of a restaurant bill; and
      a processing unit for executing the computer executable instructions, wherein said processing unit is communicatively connected to the pressure sensitive display, the magnetic reader, the wireless device and the memory; and
   a billfold comprising at least a first flap, a second flap and a hinge connecting said first flap to said second flap, wherein the billfold houses at least a portion of the computing system.

2. The device of claim 1, wherein the pressure sensitive display, the wireless communication device, the memory and the processing unit are housed within the billfold.

3. The device of claim 1, wherein the pressure sensitive display is housed within the first flap.

4. The device of claim 3, wherein the wireless communication device, the memory and the processing unit are housed within the second flap.

5. The device of claim 4, wherein the second flap comprises padding material to protect the wireless communication device, the memory and the processing unit.

6. The device of claim 2, wherein the pressure sensitive display, the wireless communication device, the memory and the processing unit are housed within the first flap.

7. The device of claim 1, wherein the magnetic strip reader is mounted on said hinge.

8. The device of claim 3, wherein the magnetic strip reader is mounted on said first flap.

9. The device of claim 3, wherein the magnetic strip reader is mounted on said second flap.

10. The device of claim 1, wherein the device has a thickness of no less than 0.2 cm and no greater than 3 cm.

11. A system for presenting and facilitating payment of a restaurant bill for a group of patrons, the system comprising:
    a computing system for processing payment of a restaurant bill, wherein the computing system performs the steps of:
       receiving information regarding a number of paying patrons;
       receiving information regarding whether a bill will be divided evenly among the paying patrons;
       in response to receipt of information that the bill will not be divided evenly among the paying patrons, receiving item information for a first paying patron, then receiving gratuity information for the first paying patron;
       in response to receipt of information that the bill will be divided evenly among the group of patrons, receiving gratuity information from a first paying patron;
       processing payment of a portion of the bill being paid by the first paying patron; and
    a billfold comprising at least a first flap, a second flap and a hinge connecting said first flap to said second flap, wherein the billfold houses at least a portion of the computing system.

12. The system of claim 11, wherein the processing payment step comprises receiving information regarding a form of payment from the first paying patron.

13. The system of claim 12, wherein the processing payment step further comprises receiving payment information encoded on a magnetic strip.

14. The system of claim 12, wherein the processing payment step further comprises receiving information indicating whether a transaction receipt should be electronically mailed to the first paying patron.

15. The system of claim 12, wherein the processing payment step comprises receiving information indicating an amount of cash that will be tendered by the first paying patron for payment of the portion of the bill.

16. The system of claim 11, wherein the computing system comprises a display and further performs the following steps:
    receiving information regarding conditions within a restaurant;
    determining whether to offer discounts, based on the conditions; and
    if a determination is made to offer discounts, displaying discount information to the group of patrons.

17. The system of claim 11, wherein the computing system comprises a display and further performs the following steps:
    displaying a survey question to a patron; and
    receiving an answer to the survey question from the patron.

18. A system for presenting and facilitating payment of a restaurant bill for a group of patrons, the system comprising:
    a computing system for processing payment of a restaurant bill, the computing system comprising:
       a pressure sensitive display for displaying information and for receiving input from a patron;
       a magnetic strip reader for receiving payment information encoded on a magnetic strip;
       a wireless communication device for communicating with a central computing system;
       memory for storing computer executable instructions for facilitating payment of a restaurant bill; and
       a processing unit for executing the computer executable instructions,
    wherein when the computer executable instructions are executed the following steps are performed:
       receiving information regarding a number of paying patrons;
       receiving information regarding whether a bill will be divided evenly among the paying patrons;
       in response to receipt of information that the bill will not be divided evenly among the paying patrons, receiving item information for a first paying patron, then receiving gratuity information for the first paying patron;
       in response to receipt of information that the bill will be divided evenly among the group of patrons, receiving gratuity information from a first paying patron;
       processing payment of a portion of the bill being paid by the first paying patron; and
    a billfold comprising at least a first flap, a second flap and a hinge connecting said first flap to said second flap, wherein the billfold houses at least a portion of the computing system.

19. The system of claim 18, wherein the memory has further computer executable instructions for performing the steps of:

receiving information regarding conditions within a restaurant;

determining whether to offer discounts, based on the conditions; and if a determination is made to offer discounts, displaying discount information to the group of patrons.

20. The system of claim 18, wherein the memory has further computer executable instructions for performing the steps of:

displaying a survey question to a patron on said pressure sensitive display; and receiving an answer to the survey question from the patron using said pressure sensitive display.

* * * * *